UNITED STATES PATENT OFFICE.

JOHN H. SCHNEIDER, OF CINCINNATI, OHIO.

PROCESS OF PRESERVING CORN.

1,000,041.     Specification of Letters Patent.     Patented Aug. 8, 1911.

No Drawing.     Application filed April 22, 1911. Serial No. 622,787.

*To all whom it may concern:*

Be it known that I, JOHN H. SCHNEIDER, a citizen of the United States, and resident of Cincinnati, Hamilton county, State of Ohio, have invented certain new and useful Improvements in Processes of Preserving Corn, of which the following is a specification.

It is well known that corn preserved and canned by ordinary methods loses to some extent its flavor and acquires a color which is darker than the natural tint of the corn, and which renders it unattractive in appearance.

I have invented or discovered a new process of preserving corn which not only causes it to retain the exact flavor of new corn, but causes it to also maintain indefinitely the appearance of corn newly cut from the cob. This new process is as follows: The corn is cut from the cob in the usual manner and preferably without mutilating the grains any more than is necessary in separating them from the cob. I add to five gallons of the cut corn about two and one-half pounds of sugar, two and one-quarter pounds of salt and five quarts of hot water and then boil this mixture for a minimum of twenty minutes. The corn is then prepared for canning and it may be put up in hermetically sealed cans in the usual manner. I prefer however to pack it in glass jars, hermetically sealed, to avoid any possibility of contamination from the metal of the cans or the ingredients used in soldering and sealing the cans. Corn thus preserved will not only retain its color and flavor but the grains will remain firm and retain the shape and general appearance which they had when newly cut. In preparing the corn for serving it is preferable to rinse it in cold water or to allow it to remain in cold water for some little time to remove the salt.

It will be understood that my improved process is not limited to the exact proportions of the ingredients above mentioned or to any exact amount of boiling. The proportions of ingredients which I have stated are those which I have thoroughly tested and found to produce the results mentioned herein. Corn preserved according to my method has a higher market value than corn preserved according to ordinary methods, it is perfectly natural in appearance and therefore much more attractive, and it retains the taste or flavor of fresh corn.

Having thus described my invention what I claim as new and desire to secure by Letters-Patent is,

1. The method of preserving corn cut from the cob, which consists in mixing the cut corn, sugar, salt and water in substantially the proportions of five gallons of cut corn, two and one-half pounds of sugar, two and one-quarter pounds of salt, and five quarts of water, boiling the mixture, then placing the same in vessels and hermetically sealing the vessels.

2. The method of preserving corn cut from the cob, which consists in mixing the corn with sugar, salt and hot water in substantially the proportions of five gallons of cut corn, two and one-half pounds of sugar, two and one-quarter pounds of salt, and five quarts of hot water, boiling the mixture for not less than twenty minutes, then placing the same in vessels and hermetically sealing the vessels.

In testimony whereof I affix my signature in presence of two witnesses.

JOHN H. SCHNEIDER.

Witnesses:
EDGAR HICKEY,
JAMES M. RIDDELL.

Copies of this patent may be obtained for five cents each, by addressing the "Commissioner of Patents, Washington, D. C."